May 28, 1946.  J. T. MULLER  2,401,176
ASSEMBLING APPARATUS
Filed May 11, 1944
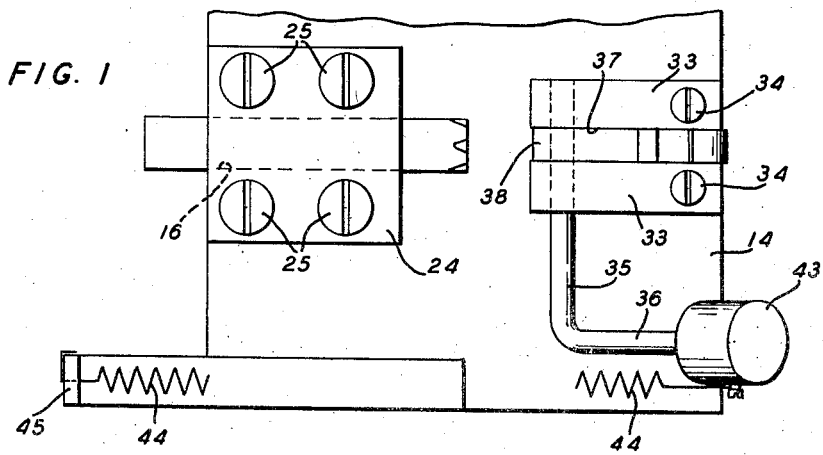
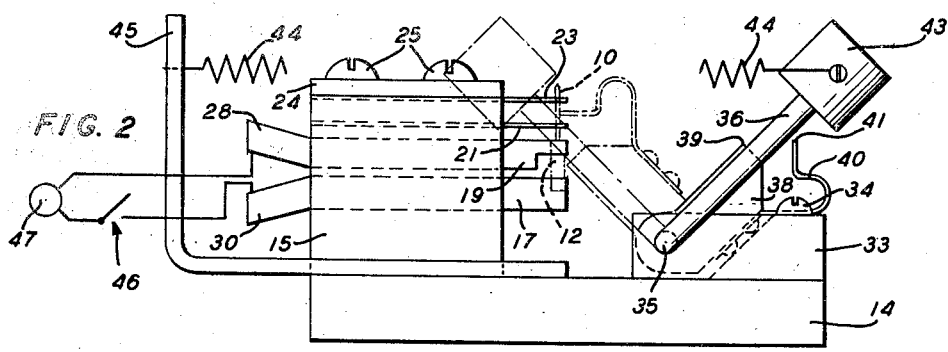
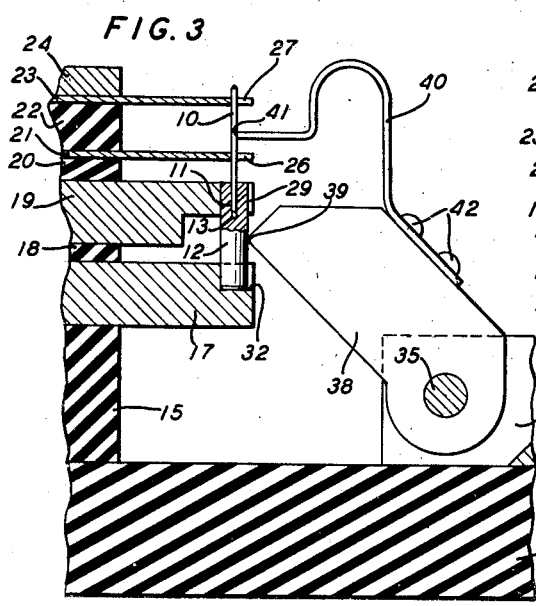
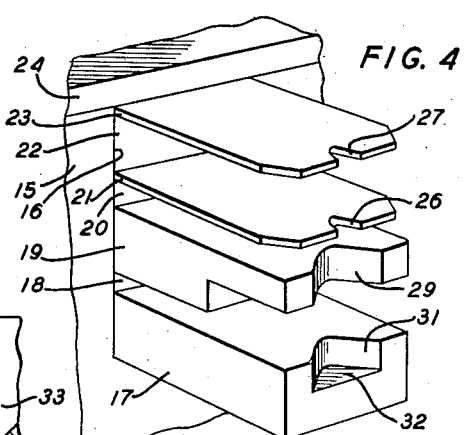
INVENTOR
J. T. MULLER
BY
E. R. Nowlen
ATTORNEY Patented May 28, 1946

2,401,176

UNITED STATES PATENT OFFICE 2,401,176

ASSEMBLING APPARATUS

John T. Muller, Livingston, N. J., assignor to Western Electric Company, Incorporated, New York, N. Y., a corporation of New York Application May 11, 1944, Serial No. 535,175

4 Claims. (Cl. 219—12)

This invention relates to assembling apparatus, and more particularly to an apparatus to hold parts to be soldered together in proper relation to each other and at the same time to supply electric current to the parts to heat the same to effect the soldering thereof.

In various arts and especially in the electrical arts there are innumerable instances where a relatively slender and lightweight metal member, e. g. a terminal wire, is to be permanently secured in a relatively massive holder member or base member, also of metal, and having a bore therein in which the first named member is to be secured. In theory, a simple way of doing this is to place an appropriate amount of solder in the bore or on the slender member, insert the latter into the bore, and heat the combination until the solder is melted. In practise, the matter is not so simple owing to the disparity in mass of the two members.

An object of the present invention is to provide simple, reliable, durable apparatus to hold two such parts in assembled relation and to supply electric current to the more massive one of the two parts only to heat the same to soldering temperature.

With the above and other objects in view, the invention may be embodied in a pair of spaced mutually insulated massive electrically conductive members formed to receive and support in an accurately predetermined position and be electrically bridged by a relatively massive metallic element to be soldered, means to support a second element in accurate predetermined relation to the first named element with a supply of solder therebetween, and movable means to seat and hold the first named element firmly and under relatively great pressure in position against the pair of conductive members and to simultaneously seat and hold the second named element under relatively light pressure against the supporting means therefor.

Other objects and features of the invention will appear from the following detailed description of one embodiment thereof, taken in connection with the accompanying drawing in which the same reference numerals are applied to identical parts in the several figures, and in which Fig. 1 is a plan view of a device constructed in accordance with the invention;

Fig. 2 is a view thereof in front elevation;

Fig. 3 is an enlarged view of a portion of the showing of Fig. 2 with parts in another position; and Fig. 4 is an enlarged detached view in perspective to show the interrelations of the several locating and conductive terminal members.

As herein illustrated, the invention is embodied in a device for use in soldering a slender pin, rod or wire 10 of metal held in a bore 11 axial in a relatively massive cylindrical base or holder 12. The device has a rectangular slab-like base 14 of electrically insulating material, e. g. wood, hard fiber, molded plastic, porcelain, hard rubber, or the like. On this, at the left, is a block 15 of similar material, rectangularly parallelopipedal in form and having a slot 16 with vertical, parallel walls and a horizontal bottom opening from the top and the right and left ends of the block 15. Located in this slot, in order from bottom to top, and filling the slot, are a combined terminal, support and locating member 17 of suitable metal, e. g. steel, stainless steel, Monel metal, or the like, a spacing member 18 of suitable insulating material, e. g. hard fiber, molded plastic, or the like; a combined terminal and locating member 19; another spacing member 20 of material like that of the member 18; a locating member 21; a third spacing member 22 also of material like that of the member 18; and a second locating member 23. A slab-like cap 24, preferably of suitable metal and covering the slot 16 and its contents and locking the latter together in the slot, is secured on the block 15 by screws or bolts 25, which may also secure the block 15 to the base 14.

The two pin locating members 21 and 23 are rigid, laminar, flat pieces of suitable material filling the slot 16 from side to side and extending out to the right from the block 15 and horizontally parallel to each other as shown. These may be of any suitable metal or rigid non-metallic material hard enough to resist wear reasonably, since their only function is to locate the pin 10 held against them. Each is formed at its outer, right end with a recess or notch, 26 or 27 respectively, in which the pin 10 may be received.

The main body of the member 19 is of rectangular cross-section to fit between the vertical walls of the slot 16. The left end of this member extends outwardly and slantingly upwardly beyond the block 15 to form a power input contact 28; while at the right the member extends outwardly and horizontally beyond the block 15 and is formed at its end with a locating notch or recess 29 to receive and locate the cylindrical holder 12. The member 17 is generally similar in form and parts to the member 19. The power input contact 30 is, however, slanted down; and the locating notch or recess 31, while open at the top, does not extend down through the thickness of the member so that there is a supporting surface 32 on which the holder 12 may rest.

The several spacing members 18, 20 and 22 are preferably rectangular and of the same size and shape as the horizontal cross-section of the slot.

The depth of the slot 16, vertically, is preferably triflingly less than the total height of the pile of members 17, 18, 19, 20, 21, 22 and 23, so that these latter are clamped securely in place by the plate 24 and screws 25.

At the right side of the base 14 a journal block 33 of any suitable material, preferably metal, is secured on the base by screws or bolts 34. The left portion of the block 33 is bifurcate as shown and a shaft 35, bent at right angles to form a handle lever 36, is journalled in the arms on either side of the slot 37. A clamping block 38, having a nose 39, is rigidly secured on the shaft 35 to be rotatable therewith in the slot 37. A clamping spring 40 is secured on the right side of the block 38 by screws 42. A weight 43, on the outer end of the handle 36, tends to retain the same in either of the positions indicated in Fig. 2. A tension spring 44 may be connected between the weight 43 and a bracket 45 mounted on the base 14, if desired.

In operation, with the parts in the position shown in Fig. 1 and with the contact members 28 and 30 connected through suitable normally open switch means indicated at 46 in Fig. 2 to a suitable source 47 of electric current, a pin holder member 12, having a pellet 13 of solder in the bottom of the bore 11 and a pin 10 seated down on the solder in the bore 11, is placed to stand, as best shown in Fig. 2, on the shelf or supporting surface 32 and back against the bottom of the notches 29 and 31, while the pin 10 rests back in the notches 26 and 27. The handle 36 is then swung (counterclockwise in Fig. 2) from the position shown in full lines in Figs. 1 and 2 to the position shown in Fig. 3 and in broken lines in Fig. 2. This action brings the clamping nose 39 of the block 38 to bear against the middle of the pin holder 12 and thus seat and hold the pin holder firmly back against the bottom faces of the notches 29 and 31 under the full combined stress of the spring 44 and weight 43. At the same time the finger 41 of the clamping spring 40 is brought against the pin 10 and holds this with a force proportioned to the relative delicacy of the pin, against the bottoms of the notches 26 and 27. The various parts are so proportioned and arranged, as shown, that the pin 10 and pin holder 12 are held safely in position relatively to each other as they should be. The delicate pin 10 is merely held accurately in position, but the relatively massive and rugged pin holder 12 is not merely held accurately in place by the nose 39 against the members 17 and 19, but is forced against these sufficiently heavily to ensure satisfactory electrical contact therewith.

The switch 46 is then closed. Current from the source 47 passes through the pin holder 12, which closes the gap between the members 17 and 19 and heats the pin holder 12 substantially uniformly throughout its mass and is allowed to continue for a sufficient time to melt the solder pellet 13. The switch 46 is then opened, the assembly 10, 12 allowed to cool or is cooled with an air blast until the solder sets, the handle 36 turned back to its original position, and the soldered assembly removed.

While the solder has been illustrated as supplied in the form of an independent pellet or body 13 of solder positioned between the two elements or members 10 and 12 to be soldered together, this pellet might be omitted if the lower end of the pin 10 were pre-dipped in molten solder before being placed in the bore 11.

The spring member 40 and its finger 41 will be so formed and dimensioned in any given instance as to exert a relatively light pressure on the pin 10, so proportioned to the nature and stiffness of this element as to hold it securely in place in the locating notches 26 and 27 without in any way deforming it, while, at the same time the nose 39 of the member 38 acts, under the full force of the spring 44 and weight 43 acting together, to exert a relatively great pressure on the element 12.

The members 17 and 19 are made of sufficiently great cross-section relatively to that of the pin holder 12 for them not to be materially raised in temperature by a current which will melt the solder pellet 13 in a brief time interval. There is no current, of course, passed through the pin 10, except possibly a negligibly small fraction of the current may pass through the portion of the pin within the pin holder.

Obviously the precise form of elements illustrated here to exemplify an application of the invention is not a limiting feature of the invention. The modifications in the shapes of the several positioning jaws and in their spatial relation to each other required in assembling some other combination of one relatively massive and one relatively delicate element to be soldered together would appear to be within the scope of the invention as pointed out in the appended claims.

What is claimed is:

1. Apparatus to hold elements to be soldered together in accurate predetermined relative position with solder therebetween and to supply heat to effect the soldering, the said apparatus comprising a pair of spaced mutually insulated massive electrically conductive members formed to receive and support in an accurately predetermined position and be electrically bridged by a relatively massive metallic element to be soldered, means to support a second element in accurate predetermined relation to the first named element with a supply of solder therebetween, movable means to seat and hold the first named element firmly and under relatively great pressure in position against the pair of conductive members, and resilient means actuable by motion of the movable means to simultaneously seat and hold the second named element under relatively light pressure against the supporting means therefor.

2. Apparatus to hold elements to be soldered together in accurate predetermined relative position with solder therebetween and to supply heat to effect the soldering, the said apparatus comprising a pair of spaced mutually insulated massive electrically conductive members formed to receive and support in an accurately predetermined position and be electrically bridged by a relatively massive metallic element to be soldered, means to support a second element in accurate predetermined relation to the first named element with a supply of solder therebetween, movable means to seat and hold the first named element firmly and under relatively great pressure in position against the pair of conductive members, and resilient means actuable by motion of the movable means to simultaneously seat and hold the second named element under relatively light pressure against the supporting means therefor, in combination with means to supply electrical current through the conductive members substantially only to the first named element to effect heating thereof to melt the solder.

3. Apparatus to hold elements to be soldered together in accurate predetermined relative position with solder therebetween and to supply heat to effect the soldering, the said apparatus comprising a pair of spaced mutually insulated massive electrically conductive members formed to receive and support in an accurately predetermined position and be electrically bridged by a relatively massive metallic element to be soldered, a pair of spaced supporting parts formed to receive and support a relatively delicate second element in accurate predetermined relation to the first named element with a supply of solder therebetween, a lever having a nose and movable to bring the nose against the first named element when in position on the two conductive members between the two members, means to stress the lever to cause the nose to exert relatively great pressure on the first named element to seat and hold the same firmly in accurate position on and electrical contact with the two conductive members, and a resilient spring member actuated by movement of the lever bringing the nose thereof against the first named element to cause a finger of the resilient member to exert relatively light pressure to seat the second named element in position against the supporting parts.

4. Apparatus to hold elements to be soldered together in accurate predetermined relative position with solder therebetween and to supply heat to effect the soldering, the said apparatus comprising a pair of spaced mutually insulated massive electrically conductive members formed to receive and support in an accurately predetermined position and be electrically bridged by a relatively massive metallic element to be soldered, a pair of spaced supporting parts formed to receive and support a relatively delicate second element in accurate predetermined relation to the first named element with a supply of solder therebetween, a lever having a nose and movable to bring the nose against the first named element when in position on the two conductive members between the two members, means to stress the lever to cause the nose to exert relatively great pressure on the first named element to seat and hold the same firmly in accurate position on and electrical contact with the two conductive members, and a resilient spring member actuated by movement of the lever bringing the nose thereof against the first named element to cause a finger of the resilient member to exert relatively light pressure to seat the second named element in position against the supporting parts, in combination with means to supply electrical current through the conductive members substantially only to the first named element to effect heating thereof to melt the solder.

JOHN T. MULLER.